Figure 1:
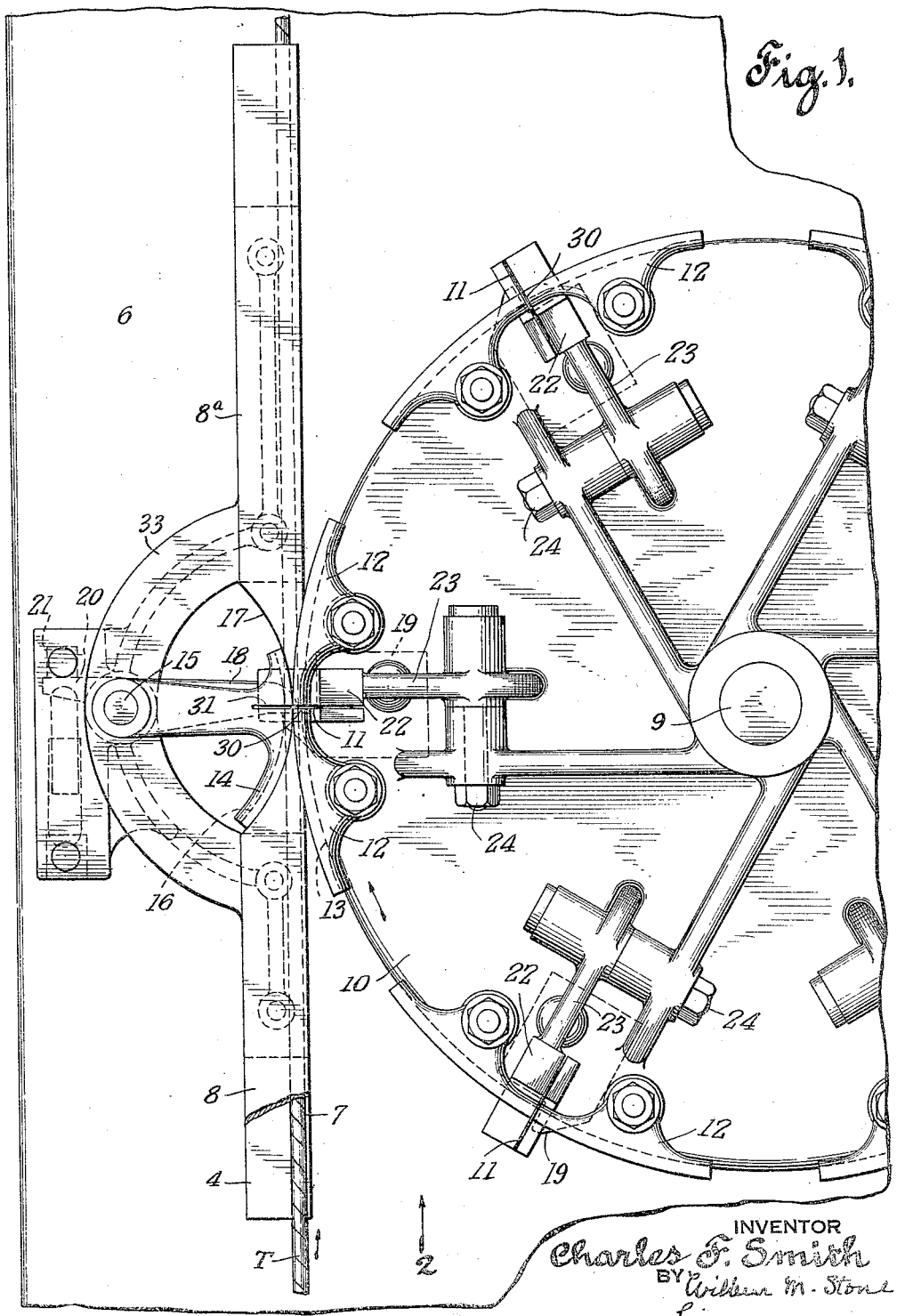

Sept. 20, 1932.  C. F. SMITH  1,878,985
TUBE CUTTING MECHANISM
Original Filed Oct. 2, 1928   2 Sheets-Sheet 1

INVENTOR
Charles F. Smith
BY Wilbur M. Stone
his ATTORNEY

Sept. 20, 1932.   C. F. SMITH   1,878,985
TUBE CUTTING MECHANISM
Original Filed Oct. 2, 1928   2 Sheets-Sheet 2
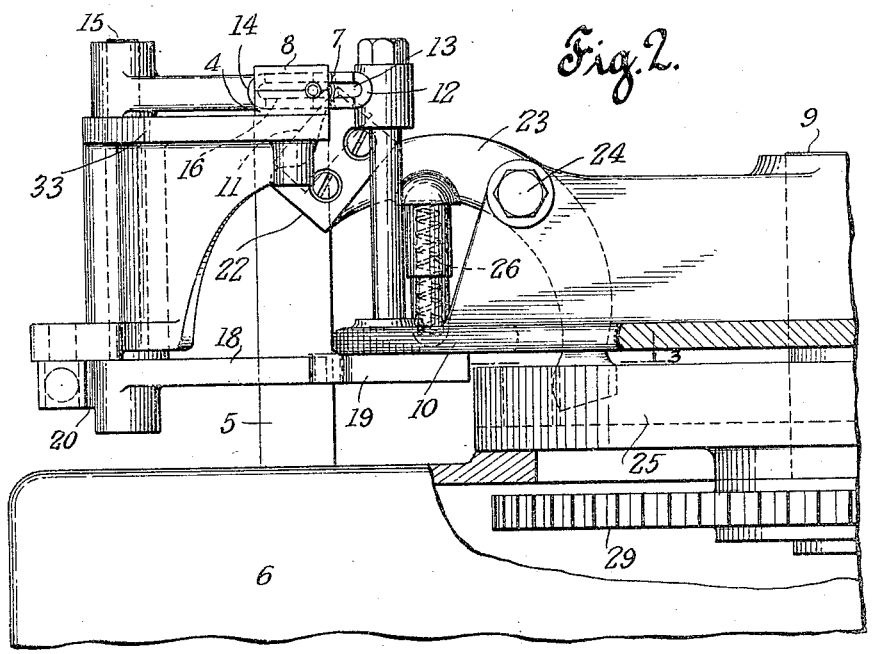
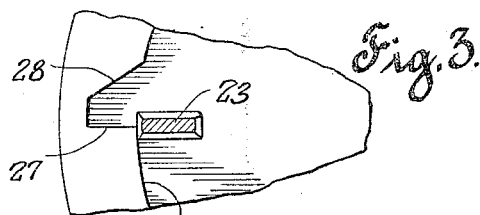
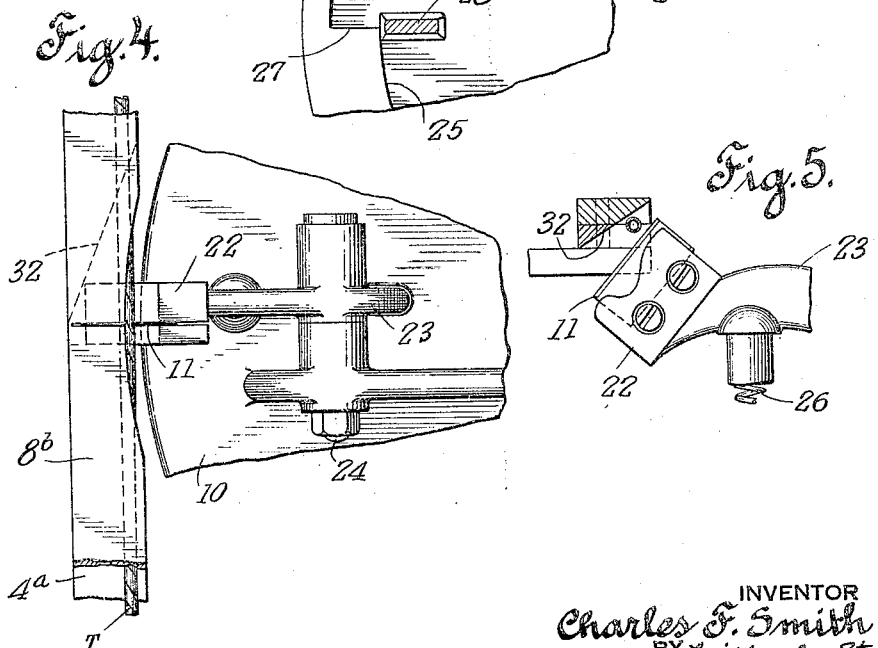
INVENTOR
Charles F. Smith
BY Wilbur M. Stone
his ATTORNEY Patented Sept. 20, 1932

1,878,985

UNITED STATES PATENT OFFICE

CHARLES F. SMITH, OF BROOKLYN, NEW YORK, ASSIGNOR, BY MESNE ASSIGNMENTS, TO LILY-TULIP CUP CORPORATION, OF NEW YORK, N. Y., A CORPORATION OF DELAWARE

TUBE CUTTING MECHANISM

Refiled for (abandoned) application, Serial No. 309,700, filed October 2, 1928. This application filed February 9, 1932. Serial No. 591,828.

This invention relates to tube cutting mechanisms and has for its object to provide a mechanism of the character specified, simple in construction, accurate in operation and having small liability to derangement.

With these and other objects which will appear later herein, my improvements comprise features illustrated in their preferred embodiment in the drawings accompanying this specification, wherein Figure 1 is a plan view of my improved mechanism. Fig. 2 is an elevation with portions broken away, looking in the direction of arrow 2, Fig. 1. Fig. 3 is a fragmentary plan view looking in the direction of arrow 3, Fig. 2. Fig. 4 is a fragmentary plan view showing a modification of a portion of what is shown in Fig. 1. Fig. 5 is a fragmentary elevation of a portion of what is shown in Fig. 4. All the figures of the drawings are to the same scale.

The present improvements are particularly applicable as an adjunct to a machine for making paper tubes of small caliber such as are supplied at soda fountains and the like. My improvements are equally useful in connection with machines for forming other tubular products such as cigarettes.

Directing attention first to Figs. 1 and 2, 4 is a bridge-like frame having opposite downwardly reaching feet as 5, fixed to hollow base 6. Said frame 4 has a lengthwise passage 7 therethrough, which may conveniently lie partly within said frame and partly within removable cap pieces 8 and 8a. Through said passage continuous tube T is advanced in the direction of its arrow to the cutting place, midway the length of frame 4 and from thence the severed portions pass onward under cap piece 8a and are discharged.

Fixed to vertical axial shaft 9 is disc 10 on which, radially arranged about its periphery, are a plurality of cutting mechanisms which will presently be described. Symmetrically arranged relatively to each cutter as 11, best shown in Fig. 5, are a series of shoes as 12, segmental in character each having in its periphery a groove 13 the cross section of which is a half-circle adapted to fit over tube T at the cutting point. Frame 4 and its caps are cut away at both sides to the axial line of tube passage 7 at the cutting point, curves swung on one side from the center of shaft 9 of disc 10, and at the other side at 17 from the center of pivot shaft 15. Said shoes, as 12, when disc 10 is rotated, swing into one cutaway portion of frame 4 and groove 13 forms a support for the tube during the cutting operation.

In its preferred form, I also provide a movable support 14 for the tube opposite to shoe 12, during the cutting operation. Said movable support is fixed to pivot shaft 15 having a bearing in segment shaped member 33 springing back from opposite portions of frame 4. Said member serves also to tie together the two portions of frame 4 which are separated at the cutting point. Movable support 14 at its segmental periphery is provided with a groove 16 similar to groove 13 of shoe 12. Axial shaft 15 of tube support 14 is vertical and parallel to shaft 9, and has fixed to its lower end arm 18 which projects to the right, Figs. 1 and 2, for engagement with each of a series of dogs as 19, fixed to the lower face of disc 10 and corresponding in number with the number of the cutting mechanisms. Arm 18 is provided with a rearwardly extending horn 20 which is normally spring urged against stop 21.

Cutter 11, preferably a thin sheet of steel, is removably held in the projecting head 22 of cam lever 23 pivoted at 24. The lower end of said lever 23 normally rides against circular track 25 and is urged thereagainst by spring 26. Said track 25 is concentric with shaft 9 and is fixed to frame 6. At the cutting point said track is cut away radially at 27 and has an angular wall 28 opposite face 27. Shoe 12 has cut 30 therethrough midway its length, and tube support 14 has cut 31 therein to permit free action of cutter 11 as that cutter rises in action.

Within frame 6 gear 29 is fixed to shaft 9 and said gear, shaft and cutter disc 10 may be rotated from some known source of power not shown.

The operation of my improved mechanism is as follows: Disc 10 being rotated in clockwise direction, Fig. 1, and tube T being fed in the direction of its arrow, one of the levers as 23 approaches the end of track 25, Fig. 3, and just as the cutter 11 reaches the cutting point, the lower end of said lever runs off from said track and is spring forced into the cavity in track 25, between walls 27 and 28. This causes cutter 11 to rise swiftly to engage and sever tube T between shoe 12 and tube support 14. At the same time dog 19 engages arm 18 and swings tube support 14 in anti-clockwise direction in time with rotation of disc 10, thereby keeping cuts 30, 31 in register with each other. The continued rotation of disc 10 promptly brings the lower end of lever 23 against wall 28 of track 25 whereby said lever is restored to its position of Fig. 1 and the cutter is withdrawn. Shortly thereafter dog 19 passes from engagement with arm 18 of tube support 14 and said support snaps back into its position of rest as in Fig. 1.

In the modification of Figs. 4 and 5 the movable tube support is omitted and the back portion of frame 4a and its cap 8b are continuous thereby providing a back support for the tube. Also in this modification the shoes as 12 of disc 10 are omitted and the cutters as 11 operate in the open. The lower portion of frame 4a is cut away at 32, from the cutting point onward, to provide room for the retraction of the cutter as that cutter is carried onward by disc 10. The operation of this modified form will be clearly understood without further description.

I claim:

1. In a cutting mechanism of the character described the combination of a rotating disc, a frame for supporting and directing the tube, a cutter carried by said disc and mounted for movement across the path of the tube to be cut, means for advancing said cutter and means for retracting said cutter.

2. In a cutting mechanism of the character described the combination of a rotating disc, a spring urged lever pivoted for radial movement thereon, a cutter in the upper end of said lever, a frame for supporting and directing the tube and a fixed circular track adapted to be engaged by the lower end of said lever, said track being cut away at one point to admit the lower end of said lever whereby the upper end of said lever is urged upward against the tube in said frame.

3. In a cutting mechanism of the character described the combination of a frame for supporting and directing the tube, a rotating disc, a cutter carried by said disc and mounted for movement across the path of the tube to be cut, means for advancing said cutter, means for retracting said cutter, a segmental shoe carried by said disc, said shoe having a passage midway its length for said cutter and said shoe having a peripheral groove to support the tube to be cut.

4. In a cutting mechanism of the character described the combination of a tube supporting and directing frame, a rotating disc, a cutter carried by said disc and mounted for movement across the path of the tube to be cut, means for advancing said cutter, means for retracting said cutter, a segmental shoe carried by said disc, said shoe having a passage midway its length for said cutter, said shoe having a peripheral groove to support the tube to be cut, an oscillatable tube support behind the path of the tube in said frame, a peripheral groove in said tube support, means carried by said disc for moving said support in register with the movement of the cutter lever and spring means for moving said support in the opposite direction.

5. In a cutting mechanism of the character described the combination of a rotating disc, a plurality of levers evenly spaced on said disc, pivoted for radial movement thereon, a cutter in the upper end of each lever, means for advancing and means for retracting said cutters, a segmental shoe adjacent each lever on said disc, said shoes each having a passage midway its length for a cutter and each of said shoes having a peripheral groove to support the tube to be cut.

6. In a cutting mechanism of the character described the combination of a rotating disc, a spring urged lever, a cutter in the upper end of said lever, a frame for supporting and directing the tube, a fixed circular track adapted to be engaged by the lower end of said lever, said track being cut away at one point to admit the lower end of said lever whereby the upper end of said lever is urged upward against the tube in said frame and a segmented shoe carried by said disc, said shoe having a passage midway its length for said cutter, said shoe having a peripheral groove to support the tube to be cut.

7. In a cutting mechanism of the character described the combination of a rotating disc, a spring urged lever pivoted for radial movement thereon, a cutter in the upper end of said lever, a frame for supporting and directing the tube, a fixed circular track adapted to be engaged by the lower end of said lever, said track being cut away at one point to admit the lower end of said lever whereby the upper end of said lever is urged upward against the tube in said frame, a segmental shoe carried by said disc, said shoe having a passage midway its length for said cutter, said shoe having a peripheral groove to support the tube to be cut, an oscillatable tube support behind the path of the tube in said frame, a peripheral groove in said tube support and means carried by said disc for moving said support in register with the movement of the cutter lever, spring means for moving said support in the opposite direction.

In witness whereof, I hereby affix my signature, this 4th day of February, 1932.

CHARLES F. SMITH.